United States Patent
Rafiq et al.

(10) Patent No.: US 10,234,155 B2
(45) Date of Patent: Mar. 19, 2019

(54) METHOD FOR TEMPERATURE CONTROL

(71) Applicant: Schneider Electric Danmark A/S, Ballerup (DK)

(72) Inventors: Osman Rafiq, Valby (DK); Paul Bell, Brønshøj (DK)

(*) Notice: Subject to any disclaimer, the term of this patent is extended or adjusted under 35 U.S.C. 154(b) by 280 days.

(21) Appl. No.: 14/914,429

(22) PCT Filed: Aug. 28, 2014

(86) PCT No.: PCT/EP2014/068265
§ 371 (c)(1),
(2) Date: Feb. 25, 2016

(87) PCT Pub. No.: WO2015/028552
PCT Pub. Date: Mar. 5, 2015

(65) Prior Publication Data
US 2016/0209069 A1    Jul. 21, 2016

(30) Foreign Application Priority Data
Aug. 30, 2013  (EP) ..................... 13182353

(51) Int. Cl.
*F24F 11/30* (2018.01)
*G05D 23/19* (2006.01)
*F24F 110/10* (2018.01)
*F24F 11/62* (2018.01)

(52) U.S. Cl.
CPC .............. *F24F 11/30* (2018.01); *F24F 11/62* (2018.01); *G05D 23/1931* (2013.01); *G05D 23/1934* (2013.01); *F24F 2110/10* (2018.01)

(58) Field of Classification Search
CPC ............ G05D 23/1934; G05D 23/1931; F24F 11/0012; F24F 11/006
See application file for complete search history.

(56) References Cited

U.S. PATENT DOCUMENTS 3,086,710 A * 4/1963 Shimko ............... F24D 5/08
236/9 R
4,279,381 A * 7/1981 Yueh ............... F24D 19/1015
165/205

(Continued)

FOREIGN PATENT DOCUMENTS

GB          2452043 A      2/2009
WO    WO 2011/114200 A1   9/2011

OTHER PUBLICATIONS

Office Action dated Dec. 2, 2016 in corresponding CN application No. 201480041671.1.

*Primary Examiner* — Kun Kai Ma
(74) *Attorney, Agent, or Firm* — Knobbe, Martens, Olson & Bear, LLP

(57) ABSTRACT

A method and a control system for temperature control in a temperature conditioning system. The method comprises obtaining desired temperature data; receiving temperature data from a plurality of temperature sensors, the temperature data including first temperature data from a first temperature sensor and auxiliary temperature data from an auxiliary temperature sensor; determining a first temperature setting point for a first controller of a first source based on the desired temperature data, the first temperature data and the auxiliary temperature data; and sending a first control signal indicative of the first temperature setting point to the first controller.

12 Claims, 7 Drawing Sheets

(56) References Cited

U.S. PATENT DOCUMENTS

| | | | | |
|---|---|---|---|---|
| 4,644,756 A * | 2/1987 | Sugimoto | F24F 3/065 62/160 |
| 5,209,398 A * | 5/1993 | Drees | G05D 23/1931 236/37 |
| 6,009,939 A * | 1/2000 | Nakanishi | F24F 11/006 165/205 |
| 6,591,901 B2 * | 7/2003 | Bujak, Jr. | F24F 3/06 165/208 |
| 9,069,363 B2 * | 6/2015 | Olivotti | G05D 23/1934 |
| 2003/0216837 A1 * | 11/2003 | Reich | G05B 13/021 700/276 |
| 2005/0051637 A1 * | 3/2005 | Hansen | G05D 23/1931 236/1 C |
| 2005/0161517 A1 * | 7/2005 | Helt | F24F 11/006 236/1 C |
| 2008/0307819 A1 | 12/2008 | Pham | |
| 2010/0025483 A1 | 2/2010 | Hoeynck et al. | |
| 2010/0059598 A1 | 3/2010 | Lindgren et al. | |
| 2011/0127341 A1 * | 6/2011 | Kaneoya | F24F 11/006 236/46 A |
| 2013/0056543 A1 * | 3/2013 | Olivotti | G05D 23/1934 237/8 B |
| 2013/0289778 A1 * | 10/2013 | Ishizaka | F24F 11/006 700/276 |
| 2014/0367475 A1 * | 12/2014 | Fadell | G05D 23/1902 236/1 C |
| 2016/0178225 A1 * | 6/2016 | Vallikannu | F24F 11/006 700/276 |

\* cited by examiner

US 10,234,155 B2

METHOD FOR TEMPERATURE CONTROL

CROSS-REFERENCE TO RELATED APPLICATIONS

This application is the U.S. National Phase under 35. U.S.C. § 371 of International Application PCT/EP2014/068265, filed Aug. 28, 2014, which claims priority to European Patent Application No. 13182353.6, filed Aug. 30, 2013. The disclosures of the above-described applications are hereby incorporated by reference in their entirety.

The present invention relates to a method for temperature control in a temperature conditioning system, such as a heating and/or cooling system, e.g. for building or home automation.

BACKGROUND

Most indoor spaces are nowadays equipped with one or more heating and/or cooling sources. Controlling the temperature in an indoor space such as a room or a building is performed through adjustments of the sources to achieve a desired room temperature. Usually, the adjustment is performed by setting the desired room temperature and by controlling the source accordingly in an attempt to achieve the requested temperature at the source surroundings. Nevertheless, achieving the requested temperature at the source surroundings does not guarantee reaching the requested temperature in the room. Moreover, as sources are not controlled perfectly and temperatures are not reported perfectly, it may take several adjustments before reaching a room temperature that is satisfactory with respect to the requested room temperature. However, the controlling means of the sources are often battery driven. The more adjustments are performed, the more battery is consumed. This results in a shorter battery lifetime for the various controlling means of the sources. There is therefore a need for an optimized control of the heating/cooling sources, and thereby an optimized control of the temperature.

SUMMARY

There is a need for methods and systems optimizing the control of temperature to achieve a desired temperature in e.g. a room.

Accordingly, a method for temperature control in a temperature conditioning system comprising one or more sources $S_1, S_2, \ldots S_M$ including a first source is disclosed. The method comprises obtaining desired temperature data $T_D$, and receiving temperature data $T_1, T_2, \ldots, T_N$ from a plurality of N temperature sensors, the temperature data including first temperature data $T_1$ from a first temperature sensor and auxiliary temperature data $T_{aux}$ from an auxiliary temperature sensor. The method comprises determining a first temperature setting point $TS_1$ for a first controller of the first source based on the desired temperature data $T_D$, the first temperature data $T_1$ and/or the auxiliary temperature data $T_{aux}$. Further, the method may comprise sending a first control signal indicative of the first temperature setting point ($TS_1$) to the first controller. Further, a control system for temperature control in a temperature conditioning system comprising one or more sources $S_1, S_2, \ldots S_M$ including a first source $S_1$ is disclosed. The control system comprises a control unit, and an interface, which may be implemented as at least one interface, i.e. e.g. several interfaces. The control system is configured to obtain desired temperature data $T_D$ and to receive, via the at least one interface, temperature data $T_1, T_2, \ldots, T_N$ from a plurality of N temperature sensors, the temperature data including first temperature data $T_1$ from a first temperature sensor and auxiliary temperature data $T_{aux}$ from an auxiliary temperature sensor. The control unit is configured to determine a first temperature setting point $TS_1$ for a first controller of the first source based on the desired temperature data $T_D$, the first temperature data $T_1$ and the auxiliary temperature data $T_{aux}$. Further, the control unit may be configured to send, via the interface, a first control signal indicative of the first temperature setting point $TS_1$ to the first controller.

It is an advantage of the present invention that the battery lifetime of a controller of a source is increased while the energy consumption (or dissipation) of the source is minimized. The method and system according to the invention allow for an optimal number of adjustments of the source to achieve a requested temperature in an indoor space.

Furthermore, with the method and system according to the invention, a uniform distribution of the temperature is achieved, resulting in a satisfactory indoor climate and effective utilization of heating and/or cooling resources. The method and system according to the invention simplify and facilitate realization of distributed temperature control between one or more controllers of one or more sources.

The method and system according to the invention allow for developing an overlay control system for controlling temperature on top of any temperature conditioning system whether in a house, a building, an industrial facility, or any room thereof.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

The figures are schematic and simplified for clarity, and they merely show details which are essential to the understanding of the invention, while other details have been left out. Throughout, the same reference numerals are used for identical or corresponding parts.

DETAILED DESCRIPTION

Figure 1:
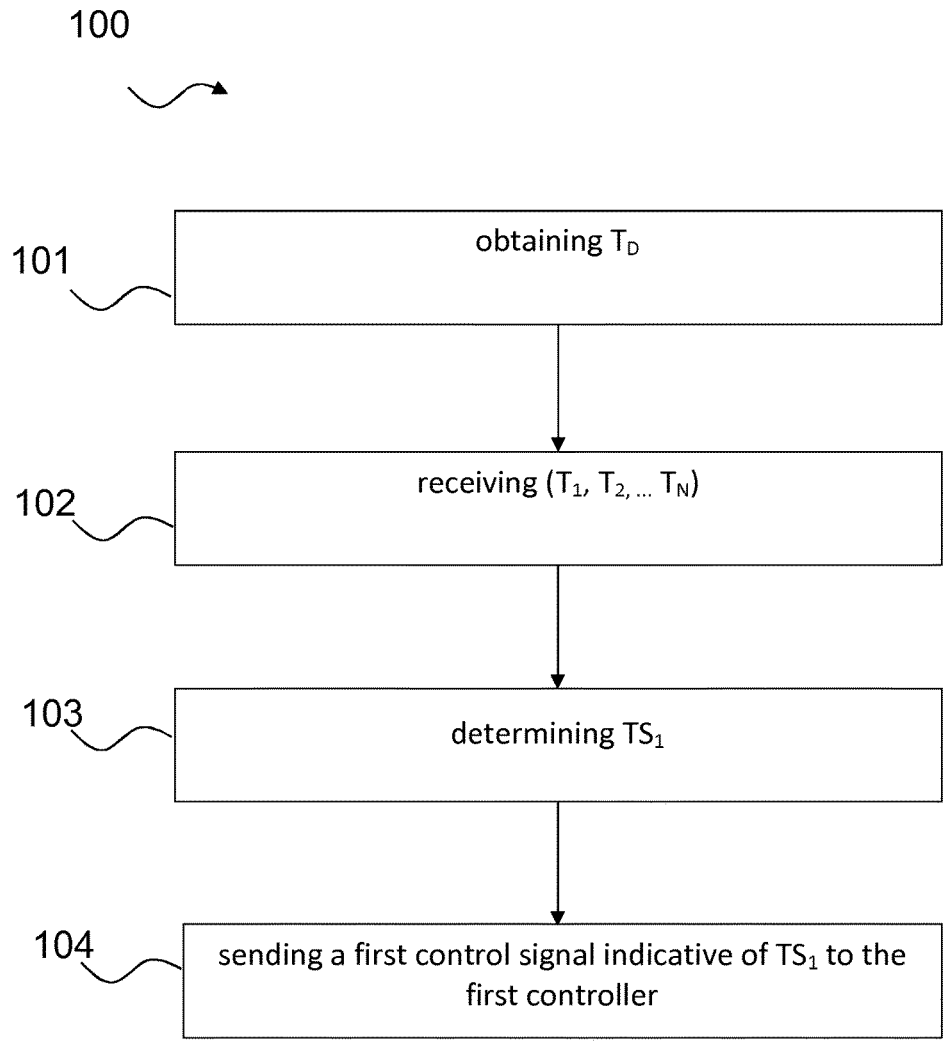
FIG. 1 is a flow diagram illustrating an exemplary method for temperature control.

The method disclosed herein is for temperature control in a temperature conditioning system comprising one or more sources.

As used herein the term "source" refers to an element generating an energy transfer between a thermodynamic system and its surroundings by e.g. conduction, and/or radiation, and/or convective circulation. A source may be a heating source and/or a cooling source. A source when adjusted may result in an increased or decreased temperature in its surroundings independently of it being a cooling source or a heating source. A heating source may be or comprise e.g. a radiator, such as a radiator for water carried heating, an electrical heater, an air conditioner and/or a flow of hot fluid. A cooling source may be e.g. a refrigerator, an air conditioner and/or a flow of cold fluid.

A temperature conditioning system may be any form of system designed to modify a temperature condition of its surroundings. A temperature conditioning system may be a system of sources that may alter and/or stabilize the temperature in a space covered by the system. A temperature conditioning system may be a system of radiators linked or not to a central heating infrastructure, or a system of air conditioners linked or not to a central infrastructure.

As used herein the term "temperature sensor" refers to a device capable of measuring a temperature or a temperature gradient. A temperature sensor comprises means sensitive to a physical change occurring with temperature, and means of converting the physical change into a signal that can be read by an observer or an observer device.

A temperature sensor may further comprise means for reporting a measured temperature. The reporting may be performed wirelessly or not.

Herein temperature may be expressed in e.g. Celsius or Fahrenheit or Kelvin degrees. The method is for temperature control in a temperature conditioning system comprising one or more sources including a first source. The method comprises obtaining desired temperature data ($T_D$). The desired temperature data ($T_D$) may be obtained as an input to a central unit by a user or by a user computing device or as an input to a controller of a source. The desired temperature data ($T_D$) may be obtained as an input to a user interface, for example associated with a temperature sensor acting as a room/building temperature sensor. The desired temperature data ($T_D$) may be obtained from a memory according to a temperature scheme.

The method comprises receiving temperature data ($T_1$, $T_2$, $T_N$) from a plurality of temperature sensors, the temperature data including first temperature data ($T_1$) from a first temperature sensor and auxiliary temperature data ($T_{aux}$) from an auxiliary temperature sensor. The auxiliary temperature sensor may be a second, third or fourth temperature sensor, e.g. each associated or integrated with second, third and fourth sources/controllers, respectively. The auxiliary temperature sensor may be a temperature sensor configured for or dedicated to measuring a room temperature.

Upon determination of temperature setting point(s), the method proceeds to sending a control signal indicative of the respective temperature setting point(s) to respective controller(s). For example, the method may comprise sending a first control signal indicative of the first temperature setting point ($TS_1$) to the first controller.

As used herein the term "controller" refers to a device by which a control system acts upon a source. A controller may comprise a heating actuator, and/or a cooling actuator. A controller may be mechanically actuated or electrically actuated. A heating or cooling actuator may be a valve actuator, and/or an electric heating actuator. A controller may further comprise an interface for receiving the first control signal. A controller is usually battery driven and has thus a limited lifetime. It may then be important to save the battery lifetime by ordering as few adjustments as possible while still satisfying required temperature conditions. For example, for a valve actuator which is battery driven, there should be as few cycles as possible to maximize the battery lifetime and actuator lifetime. For a valve actuator, there is a limited lifetime (i.e. cycles) for a motor operating an adjustment of the valve. For an electrical heating actuator, a relay of the actuator may have a lifetime of about 20 000 cycles.

Upon receiving the first control signal, the first controller may then adjust the first source in such a way that the first temperature setting point may be achieved in the surroundings of the first source. Eventually, this may lead to the desired temperature being reached at a larger scale (e.g. at a desired location, space or area), such as in a room where the source is located.

Temperature sensor(s), such as the first temperature sensor and/or a second temperature sensor, may be integrated or otherwise associated with a controller/source. Temperature sensor(s) may be located at the respective sources, such as within a half or one or two meters of the respective sources. This may allow for measuring the temperature in the immediate surroundings of the respective sources.

The first temperature sensor may be integrated or otherwise associated with the first controller. The first temperature sensor may report temperature data periodically. The temperature sensor may report temperature data e.g. every 5, 10, or 20 minutes, or 1 hour. The method for temperature control in a temperature conditioning system comprising one or more sources may be carried out or initiated every time temperature measurement data is reported by one of the temperature sensors or at selected times.

The method may comprise determining one or more, e.g. a plurality of, temperature setting points for respective controllers of respective sources based on the desired temperature data ($T_D$), the temperature data ($T_1$, $T_2$, ..., $T_N$) and optionally the auxiliary temperature data ($T_{aux}$).

The method comprises determining a first temperature setting point ($TS_1$) for a first controller of the first source based on the desired temperature data ($T_D$), the first temperature data ($T_1$) and the auxiliary temperature data ($T_{aux}$).

The method may comprise determining a second temperature setting point ($TS_2$) for a second controller of a second source based on the desired temperature data ($T_D$), the second temperature data ($T_2$) and the auxiliary temperature data ($T_{aux}$).

A temperature setting point may be based on an offset ($\Delta T$), such as an individual offset for each controller, or a common offset for at least a plurality of controllers, based on temperature data from at least two of the plurality of temperature sensors.

The first temperature setting point ($TS_1$) may be based on a first offset ($\Delta T_1$) based on the temperature data from at least two of the plurality of temperature sensors.

The first temperature setting point ($TS_1$) may be given by $$TS_1 = T_D - \Delta T_1 \qquad (1)$$

where $T_D$ is desired temperature data and $\Delta T_1$ is the first offset based on the temperature data from at least two of the plurality of temperature sensors.

The first offset ($\Delta T_1$) may be based on a difference between the first temperature data ($T_1$) from the first temperature sensor and the auxiliary temperature data ($T_{aux}$) from the auxiliary temperature sensor. The auxiliary temperature data may be reported from a temperature sensor associated with a source, such as from a second temperature sensor of a second source. Accordingly, the auxiliary temperature sensor may be a second temperature sensor.

An offset, e.g. the first offset ($\Delta T_1$) based on which a first temperature setting point may be derived and a signal indicative thereof may be sent to a first controller, may be given by $$\Delta T_1 = T_1 - T_{aux} \quad (2)$$

where the first temperature data ($T_1$) from the first temperature sensor, which may be arranged at the first source, which may be controlled by the first controller, is measured by the first temperature sensor, and the auxiliary temperature data ($T_{aux}$) from the auxiliary temperature sensor may be measured by a room temperature sensor provided possibly at a relevant distance from the first source, such as further away from the first source than the first temperature sensor is from the first source, and/or provided at a location of the room, at which location there is a desire for a desired temperature to be achieved.

An offset may be based on a difference between the temperature data from the temperature sensor in question and a statistical measure derived from temperature data from the plurality of sensors, or at least a plurality thereof. The statistical measure may be a mean, an average, a median or any other statistical measure derived from the plurality of temperature data $T_1$, $T_2$, $T_N$. An offset, e.g. the first offset ($\Delta T_1$), may be based on a function f, e.g. a first function ($f_1$), of temperature data ($T_1$, $T_2$, $T_N$) from the plurality of sensors. For example, in a system with first, second, and third sensors respectively associated with first, second and third sources, the second temperature sensor may be the auxiliary temperature sensor and the first offset $\Delta T_1$ may be based on second temperature data $T_2$ and/or third temperature data $T_3$. For example, the first offset may be given by $$\Delta T_1 = T_1 - f_1(T_2, T_3), \quad (3)$$

where $f_1$ is a weighting function returning a value indicative of a room temperature.

The method may comprise setting an offset to a compensated offset if the offset in question fulfils an offset criterion, e.g. the method may comprise setting the first offset to a compensated first offset if the first offset fulfills an offset criterion. For example, the offset criterion may include determining if the numerical value of the first offset is larger than an upper threshold, e.g. 3° C., and/or less than a lower threshold, e.g. 0.5° C. The compensated offset, e.g. the first compensated offset may be a predefined value, e.g. zero, 1° C. or 2° C. or another value, or the compensated offset may be calculated as a function of the original offset, e.g. such as a half or a third of the original offset.

The method may comprise determining a second temperature setting point ($TS_2$) for a second controller of a second source based on the desired temperature data ($T_D$) and data from at least two of the plurality of temperature sensors; and sending a second control signal indicative of the second temperature setting point ($TS_2$) to the second controller.

The method may comprise determining if a proceed criterion is fulfilled. The proceed criterion may evaluate if a time period since last adjustment has elapsed and/or if the desired temperature has changed.

In a scenario with a plurality of sources, each source being controlled by a respective controller of a plurality of controllers, a plurality of offsets may be determined to derive a plurality of temperature setting points. Then, a plurality of signals indicative of the plurality of determined temperature setting points may be sent to the plurality of controllers of the plurality of sources. The plurality of offsets may then be given by $$\Delta T = \begin{pmatrix} \Delta T_1 \\ \Delta T_2 \\ \vdots \\ \Delta T_n \end{pmatrix} = \begin{pmatrix} f_1(T_1, \ldots, T_N) \\ f_2(T_1, \ldots, T_N) \\ \vdots \\ f_n(T_1, \ldots, T_N) \end{pmatrix} \quad (4)$$

Where $\underline{\Delta T}$ is a vector comprising the plurality of offsets, ($f_1, \ldots, f_n$) is a plurality of functions of the temperature data ($T_1$, $T_2$, $T_N$) with n being the number of controllers and N being the number of temperature sensors. There may be equally many controllers as temperature sensors (i.e. n=N), e.g. one controller and one temperature sensor per source. However, the present invention may as well be implemented with fewer or more temperature sensors than controllers and/or the method may be carried out by employing fewer or more temperature sensors than controllers, e.g. irrespectively of the available number or temperature sensors and controllers, respectively.

The method may further comprise obtaining additional temperature data ($T'_1$, $T'_2$, $T'_N$) at a first time after sending the first control signal, and, if a first criterion based on the additional temperature data is fulfilled, determining an additional first temperature setting point ($TS'_1$) and sending an additional first control signal indicative of the additional first temperature setting point ($TS'_1$) to the first controller.

The first criterion may be defined here to verify whether the desired temperature and/or the temperature setting point have been achieved or substantially reached, e.g. in a close range of the desired temperature and/or the temperature setting point. The first criterion based on the additional temperature data may be based on a temperature data such as the desired temperature data or the temperature setting point. The first criterion may be that the additional temperature data shows that the measured additional temperature data obtained is within a predefined range, e.g. ±0.5 degree, around the desired temperature or the temperature setting point. The first criterion may also take into account the granularity of the precision with which the temperature sensors measure the temperature data.

FIG. 1 shows a flow diagram illustrating an exemplary method 100 for temperature control. The method 100 for temperature control in a temperature conditioning system comprising one or more sources including a first source comprises obtaining 101 desired temperature data ($T_D$). The desired temperature data ($T_D$) may be obtained from a room controlling device comprising an auxiliary temperature sensor and a user interface for indication of a desired temperature. Alternatively or in combination, the desired temperature data may be obtained from a temperature table and/or from an external control device, such as a smart phone via a control application (App). The method 100 comprises receiving 102 first temperature data ($T_1$) from a first temperature sensor and auxiliary temperature data ($T_{aux}$) from an auxiliary temperature sensor, which auxiliary temperature sensor may be a temperature sensor dedicated to measuring a general temperature or a second, third or fourth temperature sensor. For one or more embodiments of a method of the present invention obtaining 101 may occur after and/or in parallel to receiving 102. After obtaining 101 and receiving 102, the method 100 then proceeds to determining 103 a first temperature setting point ($TS_1$) for a first controller of the first source based on the desired temperature data ($T_D$), the first temperature data ($T_1$) and the auxiliary temperature data ($T_2$), wherein the first temperature setting point is based on a first offset ($\Delta T_1$), the first offset ($\Delta T_1$) being based on the first temperature data and the auxiliary temperature data, e.g. $TS_1 = T_D - \Delta T_1$, where $\Delta T_1 = T_1 - T_{aux}$. Upon determination of the first temperature setting point, the method 100 proceeds to sending 104 a first control signal indicative of the first temperature setting point ($TS_1$) to the first controller.

Figure 2:
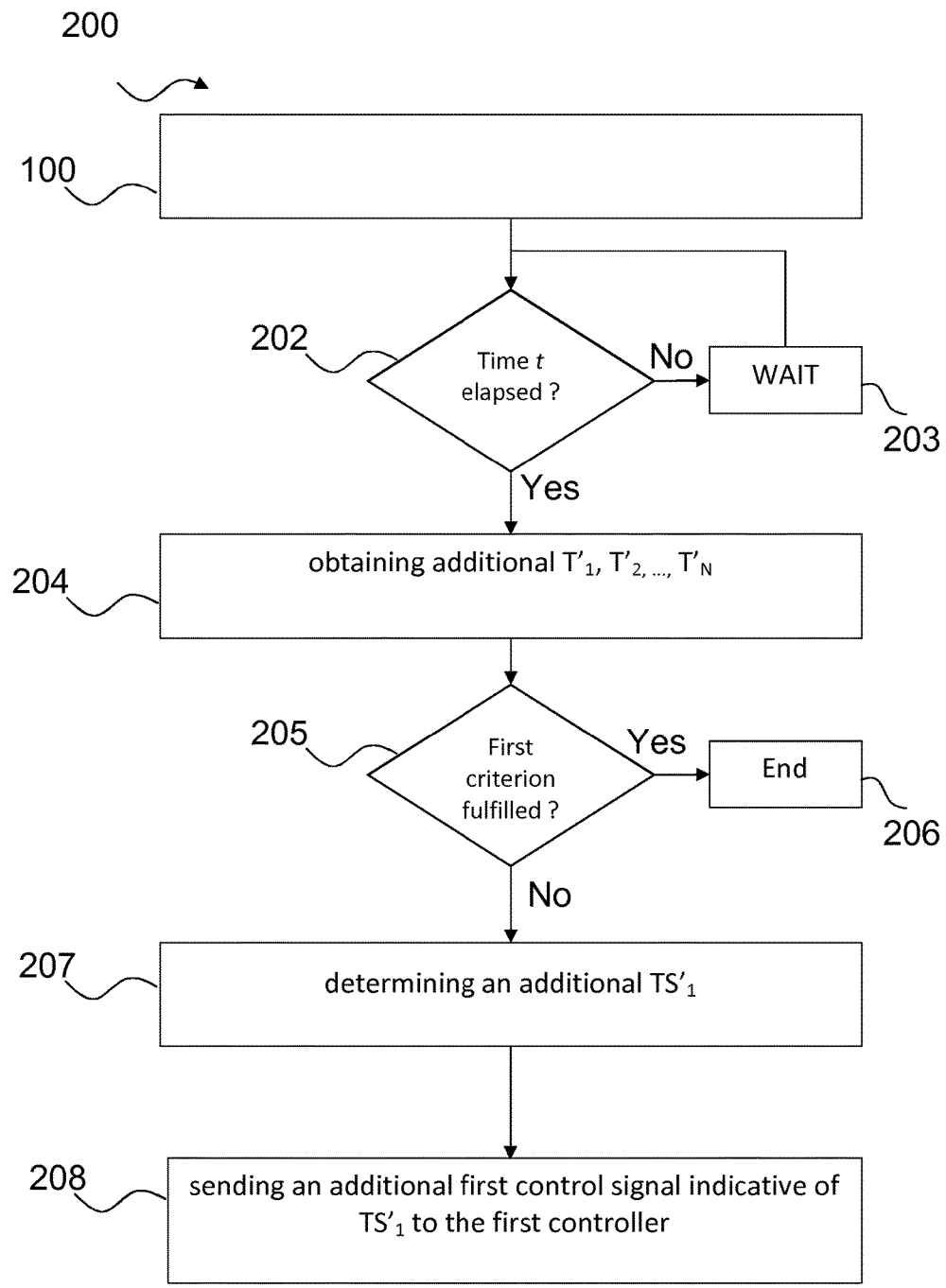
FIG. 2 is a flow diagram illustrating an exemplary method for temperature control.

FIG. 2 shows a flow diagram illustrating an exemplary method 200 for temperature control where a proceed criterion based on time, and a first criterion are taken into account for additional temperature control after the first control signal has been sent. The method 200 comprises performing the method 100 and, subsequently, determining 202 if a proceed criterion is fulfilled, e.g. as illustrated if a time period t since last adjustment has lapsed, the time period t may be a predetermined value, and waiting 203 if the time period t has not lapsed. If the time period has lapsed, i.e. the proceed criterion fulfilled, the method 200 proceeds to obtaining 204 additional temperature data ($T'_1, T'_2, T'_N$) at a first time after sending the first control signal. Subsequently to obtaining 204, determining 205 is executed to determine if the first criterion, which is based on the additional temperature data, is fulfilled and exiting 206 if the first criterion is fulfilled (e.g. if the measured additional temperature data obtained is within a range, e.g. a predefined range, around the desired temperature or the first temperature setting point). If the first criterion is not fulfilled (e.g. the measured additional temperature data obtained is not within a predefined range around the desired temperature or the first temperature setting point) the method 200 proceeds to determining 207 an additional first temperature setting point ($TS'_1$) and sending 208 an additional first control signal indicative of the additional first temperature setting point ($TS'_1$) to the first controller.

For one or more embodiments of a method of the present invention the determining 202 (and possible subsequent wait 203), may alternatively or additionally be carried out between obtaining 204 and determining 205 or after both obtaining 204 and determining 205.

Determining 202 if a time period t has lapsed may be necessary to obtain additional temperature data corresponding to a steady-state temperature around the source. The time period t may be e.g. 1, 2, 5, or 10 minutes.

Determining 205 if a first criterion based on the additional temperature data is fulfilled may comprise determining if the additional temperature data are within a predefined range around a given temperature data (e.g. a desired temperature data or a temperature setting point) or if a statistical measure derived from the additional temperature data is within a predefined range around a given temperature data (e.g. a desired temperature data or a temperature setting point) and/or if the additional temperature data measured from a room temperature sensor is within a predefined range around a given temperature data (e.g. a desired temperature data or a temperature setting point).

In one or more exemplary methods, the control signal(s) may be sent to the controller(s) if a second criterion is fulfilled. The second criterion may be based on a time period. The second criterion is defined here to avoid sending too often control signals to a controller which would result in too frequent adjustments of the source. This may eventually result in draining the battery of the controller.

Figure 3:
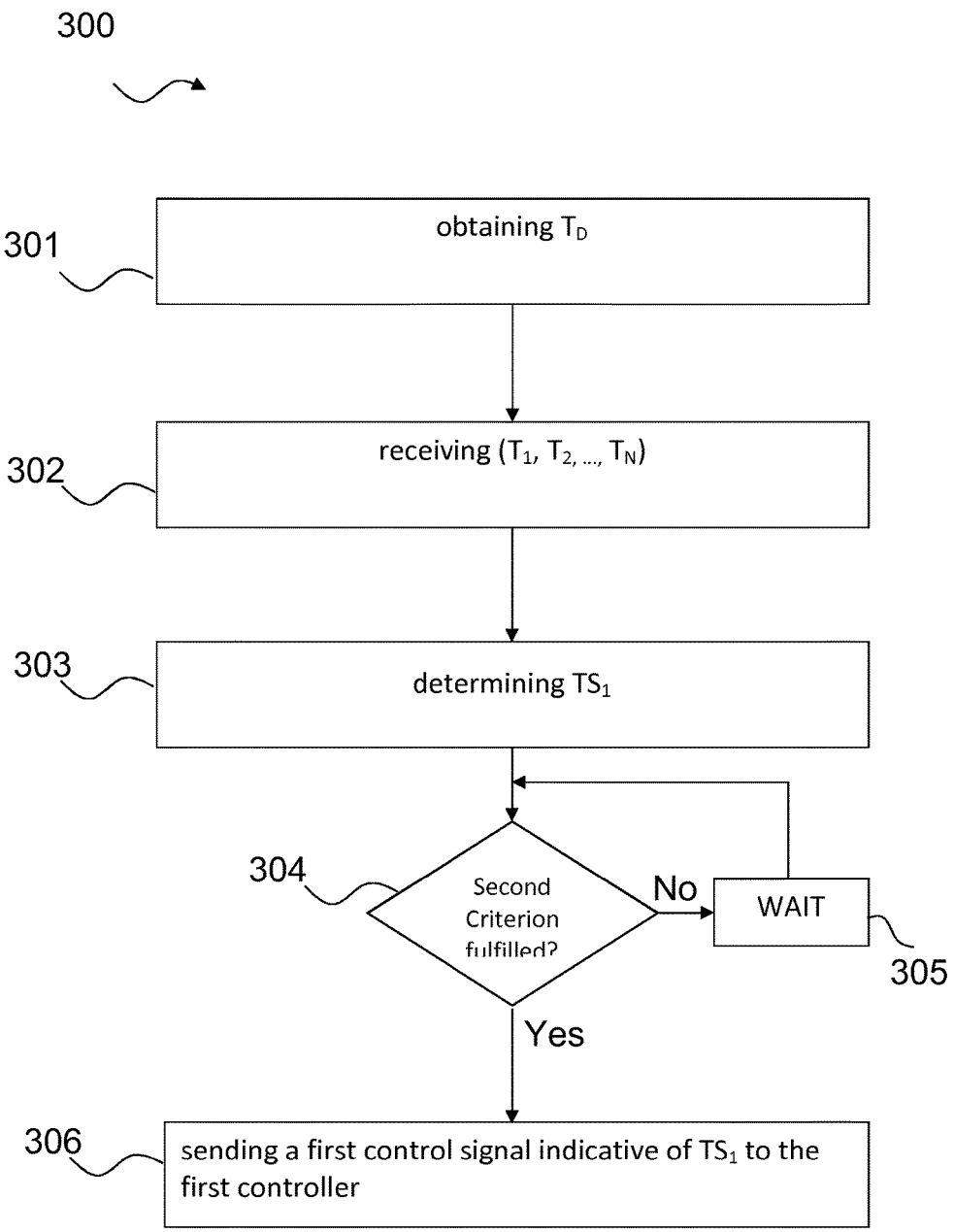
FIG. 3 is a flow diagram illustrating an exemplary method for temperature control.

FIG. 3 shows a flow diagram illustrating an exemplary method 300 for temperature control where a second criterion is introduced before sending the first control signal.

The method 300 comprises:
    obtaining 301 desired temperature data ($T_{D0}$),
    receiving 302 temperature data ($T_1, T_2, T_N$) from a plurality of temperature sensors, the temperature data including first temperature data ($T_1$) from a first temperature sensor and auxiliary temperature data ($T_{aux}$) from an auxiliary temperature sensor,
    determining 303 a first temperature setting point ($TS_1$) for a first controller of the first source based on the desired temperature data ($T_D$), the first temperature data ($T_1$) and the auxiliary temperature data ($T_{aux}$),
    determining 304 if a second criterion is fulfilled,
    waiting 305 if the second criterion is not fulfilled,
    otherwise, sending 306 a first control signal indicative of the first temperature setting point ($TS_1$) to the first controller.

Alternatively, and or additionally, the determining 304 may be carried our prior to determining 303.

After the waiting 305, the determining 303 may be excecuted.

Figure 4:
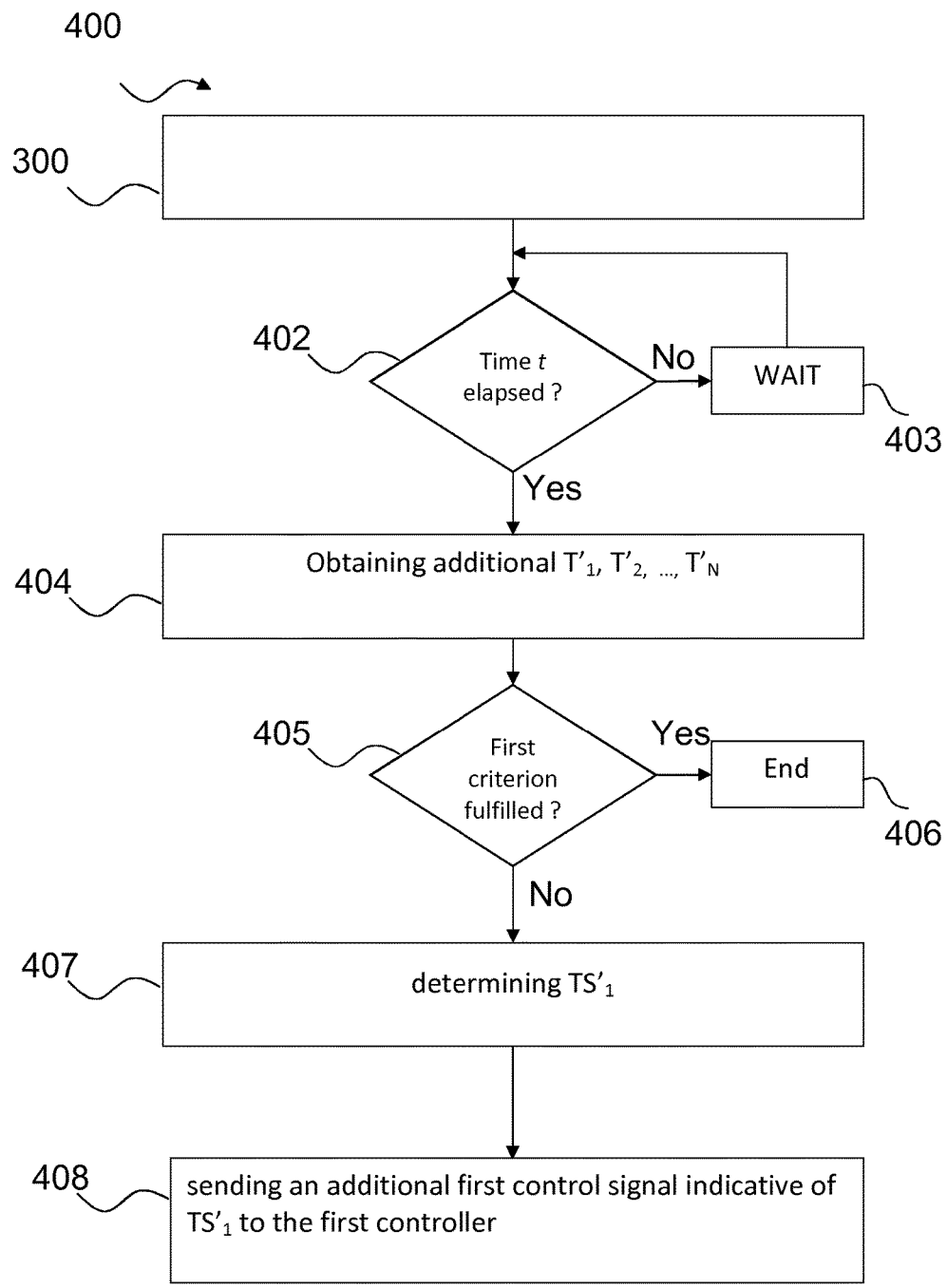
FIG. 4 is a flow diagram illustrating an exemplary method for temperature control.

FIG. 4 shows a flow diagram illustrating an exemplary method for temperature control where a second criterion is introduced before sending the first control signal and where a proceed criterion and a first criterion are taken into account for additional temperature control after the first control signal has been sent. The method 400 comprises performing the method 300; and determining 402 if a proceed criterion is fulfilled, e.g. if a time period t since last adjustment has lapsed, the time period t may be a predetermined value, waiting 403 if the time period t has not lapsed. If the time period has lapsed, i.e. the proceed criterion fulfilled, the method 400 proceeds to receiving 404 additional temperature data ($T'_1, T'_2, T'_N$) at a first time after sending the first control signal. Subsequently, the method proceeds to determining 405 if a first criterion based on the additional temperature data is fulfilled and exiting 406 if the first criterion is fulfilled, i.e. desired temperatures are reached indicating that no further adjustments are currently necessary. If the first criterion is not fulfilled, i.e. a satisfactory temperature profile has not been reached, the method proceeds to determining 407 an additional first temperature setting point ($TS'_1$), and sending 408 an additional first control signal indicative of the additional first temperature setting point ($TS'_1$) to the first controller.

The control system is for temperature control in a temperature conditioning system comprising one or more sources $S_1, S_2, \ldots S_M$ including a first source ($S_1$). The control system comprises a control unit, and at least one interface, wherein the control system is configured to obtain desired temperature data ($T_D$); and to receive, via the at least one interface, temperature data ($T_1, T_2, \ldots, T_N$) from a plurality of temperature sensors, the temperature data including first temperature data ($T_1$) from a first temperature sensor and auxiliary temperature data ($T_{aux}$) from an auxiliary temperature sensor. The control unit of the control system may be configured to determine a first temperature setting point ($TS_1$) for a first controller of the first source based on the desired temperature data ($T_D$), the first temperature data ($T_1$) and the auxiliary temperature data ($T_{aux}$). The control unit may be configured to send, via the at least one interface, a first control signal indicative of the first temperature setting point ($TS_1$) to the first controller.

The desired temperature data may be obtained from a user interface in connection with a room temperature sensor, or from a memory, e.g. lookup table. The memory may comprise temperature settings of a room, or of a building. The desired temperature data may be obtained from a smart phone or other external unit adapted to feed, e.g. with an app, desired temperature data to the control system.

Figure 5:
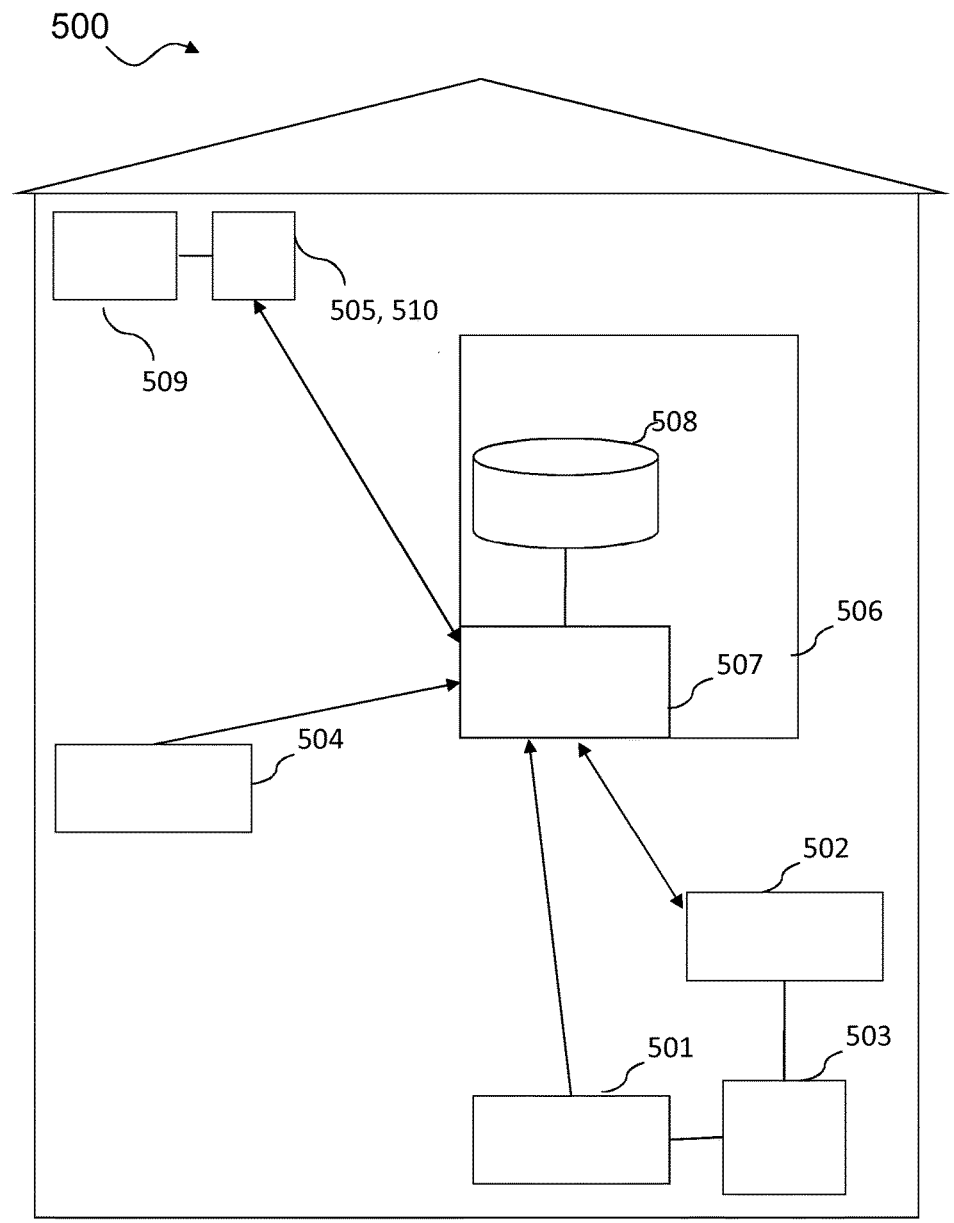
FIG. 5 schematically illustrates an exemplary architecture supporting a control system for temperature control.

FIG. 5 illustrates an exemplary architecture 500 supporting the control system 506 for temperature control in e.g. a house or a room. FIG. 5 shows a temperature conditioning system comprising a first temperature sensor 501 and a first controller 502, both arranged at a first source 503, a second temperature sensor 505 integrated with a second controller 510 and arranged at second source 509 and an auxiliary temperature sensor 504. The control system 506 is configured to obtain desired temperature data $T_D$ from a user interface integrated with the auxiliary temperature sensor 504. The control system 506 comprises an interface 507 configured to receive temperature data ($T_1$, $T_2$, $T_{aux}$) from the first temperature sensor 501, the second temperature sensor 505, and the auxiliary temperature sensor 504. The control system comprises a control unit 508 configured to determine a first temperature setting point ($TS_1$) for the first controller 502 of the first source 503 based on the desired temperature data ($T_D$), the first temperature data ($T_1$) and the auxiliary temperature data ($T_{aux}$). The control unit 506 sends, via the interface 507, a first control signal indicative of the first temperature setting point ($TS_1$) to the first controller 502 that actuates a valve or other source controlling means accordingly.

Further, the control unit 508 determines a second temperature setting point ($TS_2$) for the second controller 510 of the second source 509 based on the desired temperature data ($T_D$), the second temperature data ($T_2$) and the auxiliary temperature data ($T_{aux}$), and sends, via the interface 507, a second control signal indicative of the second temperature setting point ($TS_2$) to the second controller 510 that actuates a valve or other source controlling means accordingly. The control unit determines the first temperature setting point ($TS_1$) based on a first offset, the first offset being determined based on the temperature data from the first temperature sensor and the auxiliary sensor. The first offset may be determined following equation (2) and/or equation (3) and/or equation (4).

The first temperature sensor 501 may be arranged at or near, e.g. within 2 meters of, the first source 503. The first temperature sensor 501 may be arranged at or integrated with the first controller 502.

A temperature sensor and a controller may be physically co-located with a source. A temperature sensor may be in the vicinity of a source, and may be connected via a link to the interface of the control system. A controller may be connected via a link to the interface of the control system. The link may be wired or wireless, such as a short-range wireless link (e.g. Zigbee, Bluetooth, Infrared, IEEE 802.11, IEEE 802.15).

The control system may further be configured to send the desired temperature data ($T_D$), the first temperature data ($T_1$) and the second temperature data ($T_2$) to a remote control unit, the remote control unit being configured to determine the first temperature setting point ($TS_1$) based on the received desired temperature data ($T_D$), the received first temperature data ($T_1$) and the received second temperature data ($T_2$) and to return the determined first temperature setting point ($TS_1$). Accordingly, the control unit may be integrated and/or distributed and/or situated remotely.

The control unit may be or comprise an element of a network-based computing system such as a cloud computing system. The control unit may be a user computing device, such as a personal computer, a laptop, or a handheld device such as a phone, or a tablet.

The control unit may be connected to the rest of the control system via a network link. The network link may be wired or wireless or any combination of wired and wireless technology.

Figure 6:
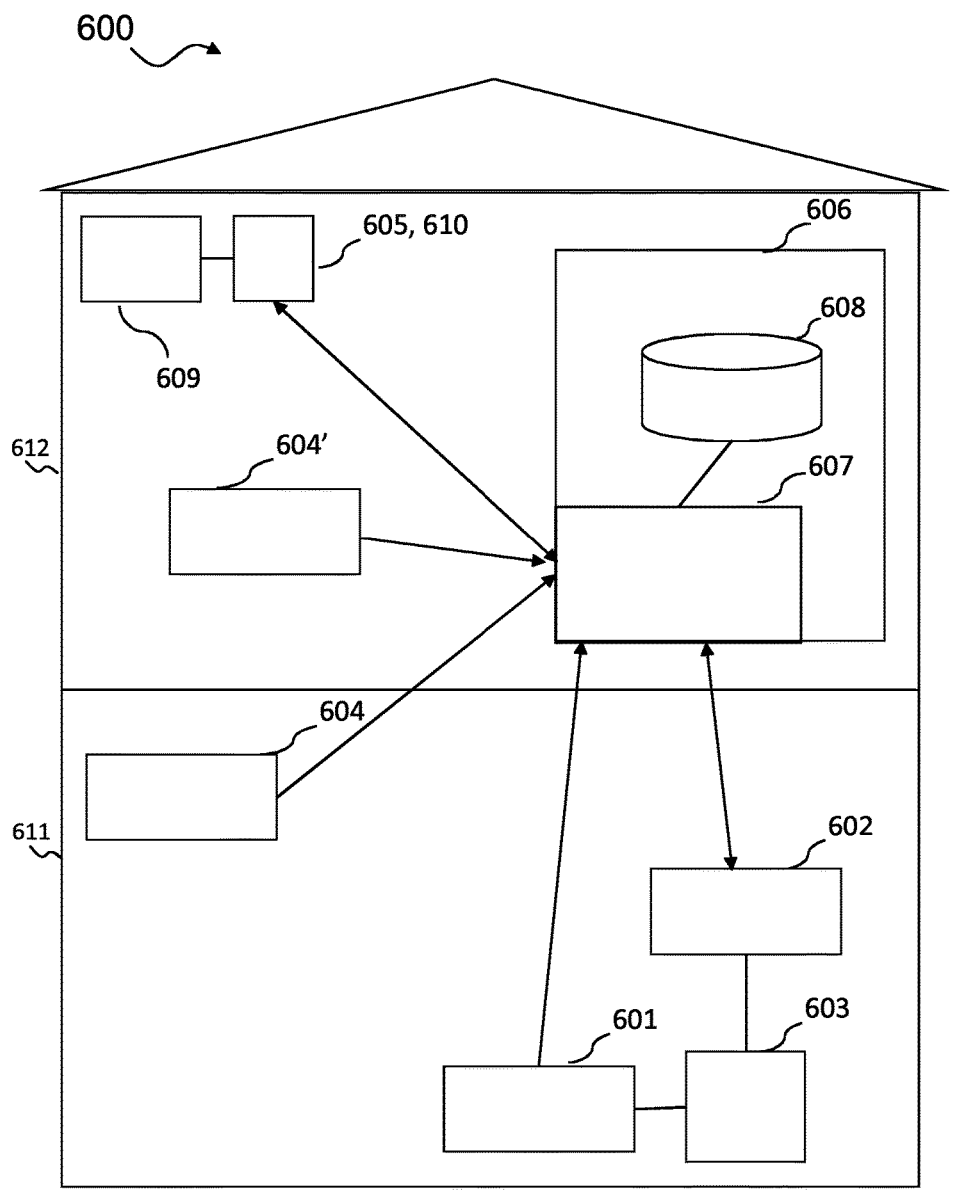
FIG. 6 schematically illustrates an exemplary architecture supporting a control system for temperature control in a house comprising two rooms.

FIG. 6 illustrates an exemplary architecture 600 supporting the control system 606 for temperature control in a house or building comprising two rooms including a first room 611 and a second room 612. The control system 606 controls the temperature in both rooms. FIG. 6 shows a temperature conditioning system comprising a first temperature sensor 601 and a first controller 602, both arranged at a first source 603 in the first room 611 together with a first auxiliary temperature sensor 604. Further, the temperature conditioning system comprises a second temperature sensor 605 with a second controller 610 arranged at second source 609 and a second auxiliary temperature sensor 604' arranged in the second room 612. The control system 606 is configured to obtain desired temperature data ($T_{D1}$, $T_{D2}$) for the first room via a user interface in the first auxiliary temperature sensor 604 and for the second room from a look-up table setting the desired temperature profile for the second room 612. The control system 606 comprises an interface 607 configured to receive temperature data from the first temperature sensor 601, the second temperature sensor 605, the first auxiliary temperature sensor 604, and the second auxiliary temperature sensor 604'. The control unit 608 determines first temperature setting point ($TS_1$) for the first controller 602 and second temperature setting point ($TS_2$) for the second controller 610. The first temperature setting point and the second temperature setting point is based on desired temperature data ($T_{D1}$, $T_{D2}$) for the first and second room, respectively.

The control unit 608 is configured to determine the second temperature setting point ($TS_2$) based on the desired temperature data ($T_{D2}$) for the second room, the second temperature data ($T_2$) and second auxiliary temperature data ($T_{aux2}$).

The control unit 608 sends first and second control signals to first and second controller, respectively, the first and second control signals being indicative of the first temperature setting point ($TS_1$) and the second temperature setting point ($TS_2$), respectively.

The control unit may further be configured to determine the first/second temperature setting point based on a first/second offset, the first/second offset being determined based on the temperature data from at least two of the plurality of temperature sensors. The first/second offset may be determined following equation (2) and/or equation (3) and/or equation (4).

If a source associated with a controller is not associated with a temperature sensor, the control unit may be configured to send a signal indicative of the desired temperature data to the controller of the sensor-less source.

Figure 7:
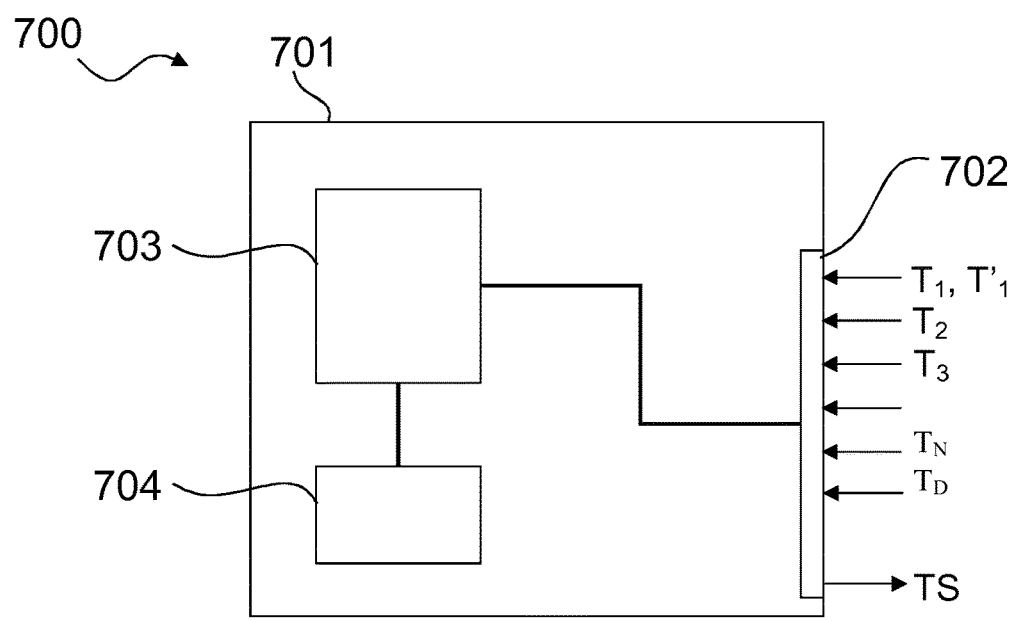
FIG. 7 schematically illustrates an exemplary control system for temperature control.

FIG. 7 shows an exemplary control system 701 for temperature control. The control system 701 is configured to obtain a desired temperature data from a memory 704 and to receive, via interface 702, a plurality of temperature data ($T_1$, $T_2$, $T'_1$, ..., $T_N$) from a plurality of sensors. The system 701 comprises a control unit 703 configured to determine temperature setting points for controllers of the respective sources based on the desired temperature data ($T_D$), respective temperature data, and configured to send, via the interface 702, control signals indicative of the temperature setting points (TS) to the respective controllers.

LIST OF REFERENCES 100 method for temperature control
101 obtaining TD 102 receiving (T$_1$, T$_2$, . . . , T$_N$)
103 determining TS$_1$
104 sending a first control signal indicative of TS$_1$ to the first controller
200 method for temperature control
202 proceed criterion fulfilled ? (Time t elapsed ?)
203 WAIT
204 obtaining additional T'$_1$, T'$_2$, . . . , T$_N$
205 first criterion fulfilled?
206 End
207 determining an additional TS'$_1$
208 sending an additional first control signal indicative of TS'$_1$ to the first controller
300 method for temperature control
301 obtaining TD
302 receiving (T$_1$, T$_2$, . . . , T$_N$)
303 determining TS$_1$
304 Second criterion fulfilled?
305 WAIT
306 sending a first control signal indicative of TS$_1$ to the first controller
400 method for temperature control
402 proceed criterion fulfilled ? (Time t elapsed ?)
403 WAIT
404 obtaining additional T'$_1$, T'$_2$, . . . , T$_N$
405 First criterion fulfilled?
406 End
407 determining an additional TS'$_1$
408 sending an additional first control signal indicative of TS'$_1$ to the first controller
500 an exemplary architecture
501 first temperature sensor
502 first temperature controller
503 first source
504 auxiliary temperature sensor
505 second temperature sensor
506 control system for temperature control
507 interface
508 control unit
509 second source
510 second temperature controller
600 an exemplary architecture
601 first temperature sensor
602 first temperature controller
603 first source
604 first auxiliary temperature sensor
604' second auxiliary temperature sensor
605 second temperature sensor
606 control system for temperature control
607 interface
608 control unit
609 second source
610 second temperature controller
611 first room
612 second room
700 exemplary architecture
701 control system for temperature control
702 interface
703 control unit
704 memory

What is claimed is:

1. A method for temperature control in a temperature conditioning system comprising one or more sources (S$_1$, S$_2$, . . . S$_M$) selected from the group of heating and cooling sources, the method comprising:

obtaining desired temperature data (T$_D$);
receiving temperature data (T$_1$, T$_2$, T$_N$) from a plurality of temperature sensors, the temperature data including first temperature data (T$_1$) from a first temperature sensor of the plurality of temperature sensors and auxiliary temperature data (T$_{aux}$) from an auxiliary temperature sensor of the plurality of temperature sensors;
determining a first temperature setting point (TS$_1$) for a first controller of a first one (S$_1$) of said one or more sources (S$_1$, S$_2$, . . . S$_M$) based on the desired temperature data (T$_D$), the first temperature data (T$_1$) and the auxiliary temperature data (T$_{aux}$); and
sending a first control signal indicative of the first temperature setting point (TS$_1$) to the first controller
wherein the first temperature setting point (TS$_1$) is based on a first offset (ΔT$_1$), the first offset (ΔT$_1$) being based on the temperature data from at least two of the plurality of temperature sensors.

2. The method according to claim 1, wherein the first temperature setting point (TS$_1$) is given by $$TS_1 = T_D - \Delta T_1$$

where T$_D$ is the desired temperature data and ΔT$_1$ is the first offset.

3. The method according to claim 1, wherein the first offset is based on a difference between the first temperature data (T$_1$) and the auxiliary temperature data (T$_{aux}$).

4. The method according to claim 1, wherein the first offset is based on a difference between the first temperature data (T$_1$) and a general temperature being a statistical measure derived from temperature data from at least some of the plurality of temperature sensors.

5. The method according to claim 1, the method comprising setting the first offset to a compensated first offset if the first offset fulfills an offset criterion.

6. The method according to claim 1, the method comprising
determining a second temperature setting point for a second controller of a second source based on the desired temperature data and data from at least two of the plurality of temperature sensors; and
sending a second control signal indicative of the second temperature setting point to the second controller.

7. The method according to claim 1, the method comprising obtaining additional temperature data (T'$_1$, T'$_2$, T'$_N$) at a first time after sending the first control signal, and, if a first criterion based on the additional temperature data is fulfilled, determining an additional first temperature setting point (TS'$_1$) and sending an additional first control signal indicative of the additional first temperature setting point (TS'$_1$) to the first controller.

8. The method according to claim 1, wherein the control signal(s) is/are sent to the controller(s) if a second criterion is fulfilled, wherein the second criterion is based on a time period.

9. The method according to claim 1, wherein the first controller comprises a heating actuator and/or a cooling actuator.

10. The method according to claim 1, wherein the first temperature sensor is located at the first one (S$_1$) of the one or more sources.

11. A control system for temperature control in a temperature conditioning system comprising one or more sources (S$_1$, S$_2$, . . . S$_M$) selected from the group of heating and cooling sources, the control system comprising a control unit, and at least one interface, wherein the control system is configured to:

obtain desired temperature data ($T_D$); and receive, via the at least one interface, temperature data ($T_1, T_2, \ldots, T_N$) from a plurality of temperature sensors, the temperature data including first temperature data ($T_1$) from a first temperature sensor of the plurality of temperature sensors and auxiliary temperature data ($T_{aux}$) from an auxiliary temperature sensor of the plurality of temperature sensors;

wherein the control unit is configured to determine a first temperature setting point ($TS_1$) for a first controller of a first one ($S_1$) of said one or more sources ($S_1, S_2, \ldots S_M$) based on the desired temperature data ($T_D$), the first temperature data ($T_1$) and the auxiliary temperature data ($T_{aux}$); and wherein the control unit is configured to send, via the at least one interface, a first control signal indicative of the first temperature setting point ($TS_1$) to the first controller, and wherein the control unit is configured to determine the first temperature setting point (TS1) based on a first offset ($\Delta T_1$), the first offset being determined based on the temperature data from at least two of the plurality of temperature sensors.

12. The control system according to claim 11, wherein the control unit is configured to determine the first temperature setting point (TS) based on:

$$TS_1 = T_D - \Delta T_1$$

wherein $T_D$ is desired temperature data and $\Delta T_1$ is the first offset.

* * * * *